US008041599B2

(12) United States Patent
Boss et al.

(10) Patent No.: US 8,041,599 B2
(45) Date of Patent: Oct. 18, 2011

(54) METHOD, SYSTEM, AND PROGRAM PRODUCT FOR SELECTING A BROKERING METHOD FOR OBTAINING DESIRED SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/756,360

(22) Filed: May 31, 2007

(65) Prior Publication Data
US 2008/0301027 A1 Dec. 4, 2008

(51) Int. Cl.
G05B 19/418 (2006.01)
G06F 9/46 (2006.01)
G06Q 10/00 (2006.01)

(52) U.S. Cl. ............................................ 705/8; 705/1.1
(58) Field of Classification Search ........................ 705/1
See application file for complete search history.

(56) References Cited

U.S. PATENT DOCUMENTS

| | | | |
|---|---|---|---|
| 5,371,780 A | 12/1994 | Amitay | |
| 6,236,981 B1 | 5/2001 | Hill | |
| 6,438,539 B1 | 8/2002 | Korolev et al. | |
| 6,550,881 B1 | 4/2003 | Phillips | |
| 6,553,568 B1 | 4/2003 | Fijolek et al. | |
| 6,678,700 B1 | 1/2004 | Moore et al. | |
| 6,732,140 B1 | 5/2004 | McCue | |
| 6,754,739 B1 | 6/2004 | Kessler et al. | |
| 6,842,899 B2 | 1/2005 | Moody et al. | |
| 6,859,927 B2 | 2/2005 | Moody et al. | |
| 6,925,493 B1 | 8/2005 | Barkan et al. | |
| 6,947,987 B2 | 9/2005 | Boland | |
| 6,968,323 B1 * | 11/2005 | Bansal et al. | ............ 705/80 |
| 7,062,559 B2 | 6/2006 | Yoshimura et al. | |
| 7,099,681 B2 | 8/2006 | O'Neill | |
| 7,103,580 B1 | 9/2006 | Batachia et al. | |
| 7,103,847 B2 | 9/2006 | Alford, Jr. et al. | |
| 7,249,099 B2 | 7/2007 | Ling | |
| 7,266,523 B2 | 9/2007 | Depura et al. | |

(Continued)

OTHER PUBLICATIONS

Boss et al, U.S. Appl. No. 11/756,325, Office Action Communication, Apr. 27, 2009, 10 pages.

(Continued)

*Primary Examiner* — Jonathan Ouellette
*Assistant Examiner* — Candice D Carter
(74) *Attorney, Agent, or Firm* — William Schiesser; Hoffman Warnick LLC

(57) ABSTRACT

Under the present invention, a set (e.g., one or more) of requests (e.g., from a single bidder or multiple bidders) for an elemental bidding resource (EBR) is received. Market conditions for the EBR are evaluated from historical data. It is then determined whether a demand for the desired EBR exceeds a supply of the EBR. Based on the market conditions, the supply, and the demand, a brokering strategy (e.g., auction versus non-auction) and associated method are selected to allocate the EBR. A resource unit broker (RUB) will then determine an outcome of the brokering method to fulfill at least one of the set of requests. The outcome and associated metrics can then be logged, it can be determined whether a sales contract was created, the EBR can be allocated, and reports/data can be updated accordingly.

17 Claims, 5 Drawing Sheets

U.S. PATENT DOCUMENTS

| | | | |
|---|---|---|---|
| 7,401,035 | B1 | 7/2008 | Young |
| 7,634,430 | B2 | 12/2009 | Huberman et al. |
| 7,899,696 | B2 | 3/2011 | Boss et al. |
| 7,899,697 | B2 | 3/2011 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1* | 6/2002 | Gilbert ............... 705/37 |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1* | 2/2003 | Mitra et al. ............ 370/400 |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1* | 5/2003 | Semret et al. ............ 705/10 |
| 2003/0101124 | A1 | 5/2003 | Semret et al. |
| 2003/0167329 | A1 | 9/2003 | Kurakake et al. |
| 2003/0216971 | A1 | 11/2003 | Sick et al. |
| 2004/0010592 | A1 | 1/2004 | Carver et al. |
| 2004/0024687 | A1* | 2/2004 | Delenda ............... 705/37 |
| 2004/0059646 | A1 | 3/2004 | Harrington et al. |
| 2004/0083160 | A1 | 4/2004 | Byde et al. |
| 2004/0111308 | A1* | 6/2004 | Yakov ............... 705/8 |
| 2004/0133506 | A1 | 7/2004 | Glodjo et al. |
| 2004/0133609 | A1 | 7/2004 | Moore et al. |
| 2004/0230317 | A1 | 11/2004 | Kumar et al. |
| 2005/0055306 | A1 | 3/2005 | Miller et al. |
| 2005/0071182 | A1 | 3/2005 | Aikens et al. |
| 2005/0138621 | A1 | 6/2005 | Clark et al. |
| 2005/0141554 | A1* | 6/2005 | Hammarlund et al. ....... 370/468 |
| 2005/0144115 | A1 | 6/2005 | Brett |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1 | 12/2005 | Friesen |
| 2006/0047550 | A1 | 3/2006 | Dineen et al. |
| 2006/0069621 | A1 | 3/2006 | Chang et al. |
| 2006/0080210 | A1 | 4/2006 | Mourad et al. |
| 2006/0080224 | A1 | 4/2006 | Schuelke |
| 2006/0080438 | A1 | 4/2006 | Storrie |
| 2006/0149652 | A1 | 7/2006 | Fellenstein et al. |
| 2006/0167703 | A1 | 7/2006 | Yakov |
| 2006/0195386 | A1 | 8/2006 | Glodjo et al. |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 | 4/2008 | Gates et al. |

OTHER PUBLICATIONS

Boss et al, U.S. Appl. No. 11/755,985, Office Action Communication, Apr. 1, 2009, 23 pages.

Duermeyer, Karin, "Methodology: From Component Business Model to Service Oriented Architecture", Copyright IBM Corporation 2004.

U.S. Appl. No. 11/755,985, filed May 31, 2007, Final Office Action dated Nov. 2, 2009.

U.S. Appl. No. 11/756,426, filed May 31, 2007, Office Action dated Oct. 29, 2009.

U.S. Appl. No. 11/756,416, filed May 31, 2009, Office Action dated Oct. 14, 2009.

U.S. Appl. No. 11/756,325, filed May 31, 2007, Final Office Action dated Oct. 13, 2009.

U.S. Appl. No. 11/756,400, filed May 31, 2007, Office Action dated Oct. 8, 2009.

U.S. Appl. No. 11/756,386, filed May 31, 2007, Office Action dated Oct. 8, 2009.

U.S. Appl. No. 11/756,325, Office Action dated Feb. 2, 2010.

U.S. Appl. No. 11/755,985, Office Action, dated Jan. 29, 2010.

U.S. Appl. No. 11/756,426, filed May 31, 2007, Final Office Action dated Mar. 24, 2010, 20 pages.

U.S. Appl. No. 11/756,416, filed May 31, 2007, Final Office Action dated Mar. 24, 2010, 14 pages.

U.S. Appl. No. 11/756,400, filed May 31, 2007, Final Office Action dated Mar. 24, 2010, 20 pages.

U.S. Appl. No. 11/756,386, filed May 31, 2007, Final Office Action dated Mar. 24, 2010, 14 pages.

U.S. Appl. No. 11/756,325, filed May 31, 2007, Notice of Allowance and Fees due dated Jul. 14, 2010, 10 pages.

U.S. Appl. No. 11/755,985, filed May 31, 2007, Final Office Action dated Jul. 1, 2010, 23 pages.

U.S. Appl. No. 11/756,416, filed May 31, 2007, Notice of Allowance and Fees due dated Jun. 30, 2010, 4 pages.

U.S. Appl. No. 11/756,313, filed May 31, 2007, Office Action dated Jun. 29, 2010, 31 pages.

U.S. Appl. No. 11/756,386, filed May 31, 2007, Notice of Allowance and Fees due dated Jun. 29, 2010, 4 pages.

U.S. Appl. No. 11/756,400, filed May 31, 2007, Office Action dated Jun. 24, 2010, 12 pages.

U.S. Appl. No. 11/756,426, filed May 31, 2007, Office Action dated Jun. 24, 2010, 10 pages.

Ozsomer et al., "A Resource-Based Model of Market Learning in the Subsidiary: The Capabilities of Exploration and Exploitation", Journal of International Marketing, vol. 11, No. 3, 2003.

Staudenmayer, Nancy, "Interdependency: Conceptual, Empirical, and Practical Issues", The International Center for Research on the Management of Technology, Jun. 1997.

Araque Jr., Gerardo, U.S. Appl. No. 11/756,313, filed May 31, 2007, Office Action dated Mar. 25, 2011, 33 pages.

Rankins, William E., U.S. Appl. No. 11/756,374, filed May 31, 2007, Office Action dated Mar. 11, 2011, 17 pages.

Nguyen, Nga B., U.S. Appl. No. 11/756,406, filed May 31, 2007, Final Office Action dated Feb. 22, 2011, 15 pages.

Garg, Yogesh C., U.S. Appl. No. 11/756,442, filed May 31, 2007, Office Action dated Feb. 10, 2011, 35 pages.

Mahapatra et al., "Oracle Parallel Processing", Copyright 2000, O'Reilly & Associates.

Carter, Candice D., U.S. Appl. No. 11/756,426, filed May 31, 2007, Notice of Allowance and Fees Due dated Oct. 20, 2010, 27 pages.

Gregg, Mary M., U.S. Appl. No. 11/755,985, filed May 31, 2007, Office Action dated Oct. 2010, 27 pages.

Carter, Candice D., U.S. Appl. No. 11/756,400, filed May 31, 2007, Notice of Allowance and Fees Due, 26 pages.

Nguyen, Nga, B., U.S. Appl. No. 11/756,406, filed May 31, 2007, Office Action dated Aug. 2010, 32 pages.

Araque Jr., Gerardo, U.S. Appl. No. 11/756,313, filed May 31, 2007, Final Office Action dated Dec. 10, 2010.

Lan, Tzu-Hsiang, U.S. Appl. No. 11/755,971, filed May 31, 2007, Office Action dated Nov. 26, 2010.

Rankins, William E., U.S. Appl. No. 11/756,374, filed May 31, 2007, Office Action dated Oct. 29, 2010, 35 pages.

U.S. Appl. No. 11/756,426, Advisory Action dated Jun. 8, 2010, 3 pages.

U.S. Appl. No. 11/756,400, Advisory Action dated Jun. 8, 2010, 3 pages.

Lan, U.S. Appl. No. 11/755,971, Office Action Communication, May 19, 2011, 16 pages.

Carter, U.S. Appl. No. 11/756,416, Notice of Allowance & Fees Due, May 17, 2011, 19 pages.

Wai, U.S. Appl. No. 11/756,357, Office Action Communication, May 26, 2011, 32 pages.

Carter, U.S. Appl. No. 11/756,386, Notice of Allowance & Fees Due, May 23, 2011, 19 pages.

Gregg, U.S. Appl. No. 11/755,985, Office Action Communication, May 5, 2011, 35 pages.

The University of Melbourne: Annual Budget 2004, 84 pages: www.unimelb.edu.au/publications/docs/budget2004.pdf.

Carter, U.S. Appl. No. 11/756,360, Notice of Allowance & Fees Due, May 20, 2011, 19 pages.
Wai, U.S. Appl. No. 11/756,367, Office Action Communication, Jun. 13, 2011, 38 pages.
Nisan, "Bidding and Allocation in Combinatorial Auctions", Proceedings of the 2nd ACM Conference on Electronic Commerce, 2000, 12 pages.

Chew, U.S. Appl. No. 11/755,980, Office Action Communication, Jun. 23, 2011, 50 pages.
Garg, U.S. Appl. No. 11/756,442, Office Action Communication, Jun. 24, 2011, 8 pages.

* cited by examiner

METHOD, SYSTEM, AND PROGRAM PRODUCT FOR SELECTING A BROKERING METHOD FOR OBTAINING DESIRED SERVICE LEVEL CHARACTERISTICS

CROSS-REFERENCE TO RELATED APPLICATIONS

This application is related in some aspects to commonly owned patent application number (to be provided), entitled "RESOURCE MANAGEMENT FRAMEWORK", assigned Ser. No. 11/756,367, filed concurrently herewith, the entire contents of which are herein incorporated by reference.

This application is related in some aspects to commonly owned patent application number (to be provided), entitled "NON-DEPLETING CHIPS FOR OBTAINING DESIRED SERVICE LEVEL CHARACTERISTICS", assigned Ser. No. 11/756,374, filed concurrently herewith, the entire contents of which are herein incorporated by reference.

This application is related in some aspects to commonly owned patent application number (to be provided), entitled "DISCRETE, DEPLETING CHIPS FOR OBTAINING DESIRED SERVICE LEVEL CHARACTERISTICS", assigned Ser. No. 11/756,357, filed concurrently herewith, the entire contents of which are herein incorporated by reference.

This application is related in some aspects to commonly owned patent application number (to be provided), entitled "FLUID, DEPLETING CHIPS FOR OBTAINING DESIRED SERVICE LEVEL CHARACTERISTICS", assigned Ser. No. 11/756,325, filed concurrently herewith, the entire contents of which are herein incorporated by reference.

FIELD OF THE INVENTION

The present invention generally relates to the brokering of biddable resources (e.g., computational resources). Specifically, aspects of the present invention address a need for selecting a most appropriate brokering method based on supply and demand metrics.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). Existing approaches fail to provide for adequate resolution of such competition. For example, none of the existing approaches appreciate factors such as market conditions, supply versus demand of desired resources, etc. In view of the foregoing, there exists a need for a solution that solves at least one of the deficiencies of the related art.

SUMMARY OF THE INVENTION

In general, aspects of the present invention provide a method for selecting a correct brokering strategy, and an associated method for facilitating the exchange of "chips" or units for elemental bidding resources (EBRs). The selection of brokering strategies and associated methods is based on factors such as market conditions, supply and demand, etc. The brokering currency is described herein as a "chip," which is an arbitrary unit of value that can be linked to any EBR that can be part of any infrastructure category. It should be noted that principles of gaming theory (e.g., unpredictable outcomes) can be applied to any of the auction strategies below. It should also be noted that, in some implementations, the non-auction techniques described herein may be used, whereas in other designs, each and every transaction could be auction-based. Each of these options is detailed below.

Under the present invention, a set (e.g., one or more) of requests (e.g., from a single bidder or multiple bidders) for an elemental bidding resource (EBR) is received. Market conditions for the EBR are evaluated from historical data. It is then determined whether a demand for the desired EBR exceeds a supply of the EBR. Based on the market conditions, the supply, and the demand, a brokering strategy (e.g., auction versus non-auction) and associated method are selected to allocate the EBR. A resource unit broker (RUB) will then determine an outcome of the brokering method to fulfill at least one of the set of requests. The outcome and associated metrics can then be logged, it can be determined whether a sales contract was created, the EBR can be allocated, and reports/data can be updated accordingly.

A first aspect of the present invention provides a method for selecting a brokering method for obtaining desired service level characteristics, comprising: receiving a set of requests for an elemental bidding resource (EBR); evaluating market conditions for the EBR from historical data; determining whether a demand for the EBR exceeds a supply of the EBR; selecting a brokering strategy to allocate the EBR based on the market conditions, the supply, and the demand; and selecting a brokering method associated with the brokering strategy.

A second aspect of the present invention provides a system for selecting a brokering method for obtaining desired service level characteristics, comprising: a system for receiving a set of requests for an elemental bidding resource (EBR); a system for evaluating market conditions for the EBR from historical data; a system for determining whether a demand for the EBR exceeds a supply of the EBR; a system for selecting a brokering strategy to allocate the EBR based on the market conditions, the supply, and the demand; and a system for selecting a brokering method associated with the brokering strategy.

A third aspect of the present invention provides a program product stored on a computer readable medium for selecting a brokering method for obtaining desired service level characteristics, the computer readable medium comprising program code for causing a computer system to: receive a set of requests for an elemental bidding resource (EBR); evaluate market conditions for the EBR from historical data; determine whether a demand for the EBR exceeds a supply of the EBR; select a brokering strategy to allocate the EBR based on the market conditions, the supply, and the demand; and select a brokering method associated with the brokering strategy.

A fourth aspect of the present invention provides a method for deploying a system for selecting a brokering method for obtaining desired service level characteristics, comprising: providing a computer infrastructure being operable to:

receive a set of requests for an elemental bidding resource (EBR); evaluate market conditions for the EBR from historical data; determine whether a demand for the EBR exceeds a supply of the EBR; select a brokering strategy to allocate the EBR based on the market conditions, the supply, and the demand; and select a brokering method associated with the brokering strategy.

A fifth aspect of the present invention provides computer software embodied in a propagated signal for selecting a brokering method for obtaining desired service level characteristics, the computer software comprising instructions for causing a computer system to: receive a set of requests for an elemental bidding resource (EBR); evaluate market conditions for the EBR from historical data; determine whether a demand for the EBR exceeds a supply of the EBR; select a brokering strategy to allocate the EBR based on the market conditions, the supply, and the demand; and select a brokering method associated with the brokering strategy.

A sixth aspect of the invention provides a data processing system for selecting a brokering method for obtaining desired service level characteristics, comprising: a processing unit; a bus coupled to the processing unit; and a memory medium coupled to the bus comprising program code, which when executed by the processing unit causes the data processing system to: receive a set of requests for an elemental bidding resource (EBR); evaluate market conditions for the EBR from historical data; determine whether a demand for the EBR exceeds a supply of the EBR; select a brokering strategy to allocate the EBR based on the market conditions, the supply, and the demand; and select a brokering method associated with the brokering strategy.

BRIEF DESCRIPTION OF THE DRAWINGS

These and other features of this invention will be more readily understood from the following detailed description of the various aspects of the invention taken in conjunction with the accompanying drawings in which.

Figure 1:
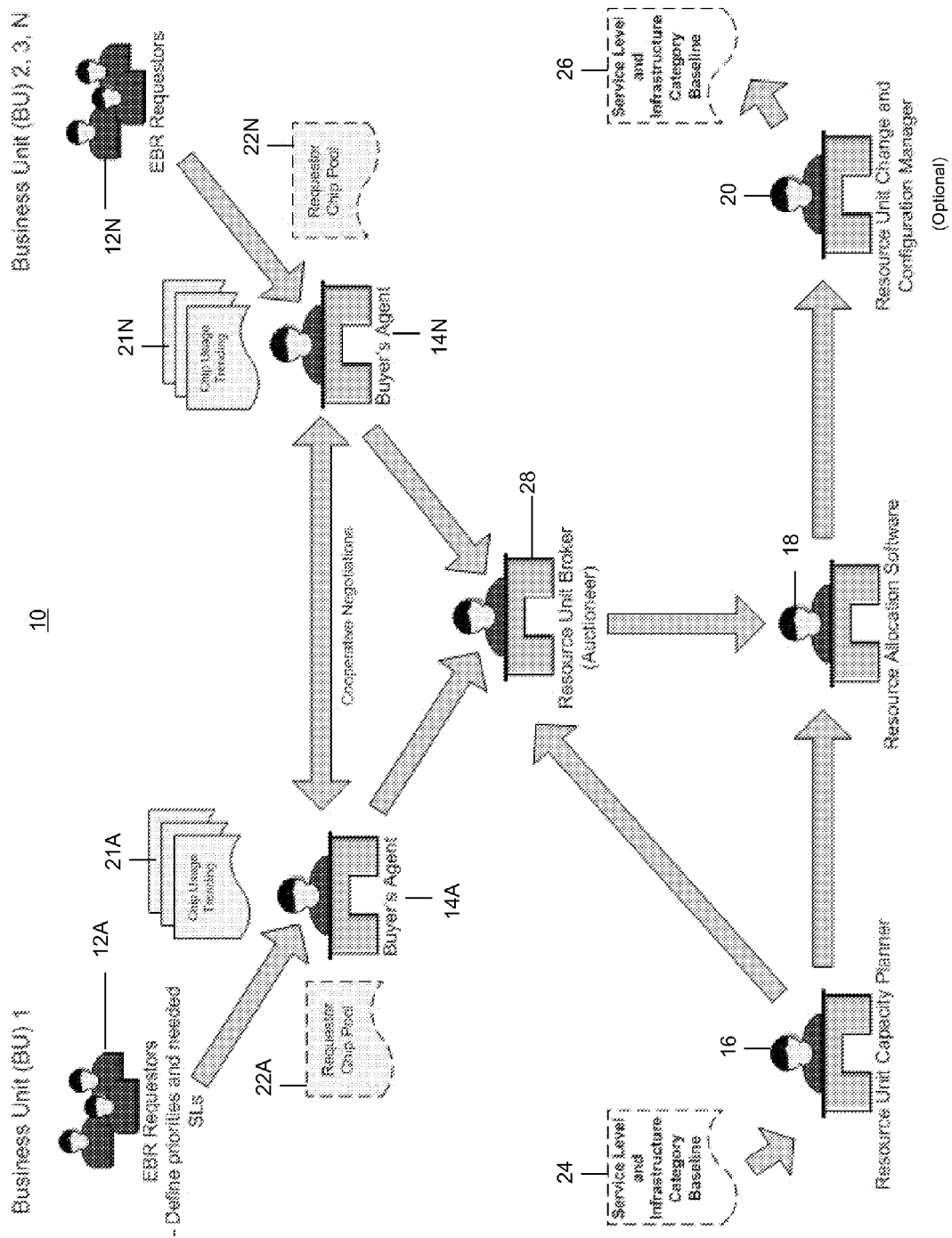
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
  A. Auction-Based Techniques
    1. Cooperative Negotiations
    2. Sole Bidder
    3. Down-Shifting of Bids
  B. Non-Auction Techniques
    1. First Come—First Served
    2. Incentive Provision (resource sale)
    3. Resource Sharing
    4. Weighted Resource Sharing
II. Computerized Implementation I. General Description As used herein, the following terms have the following definitions:

"Chip" means any unit (virtual or otherwise) that may be exchanged for resources such as Information Technology (IT) resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc) sought by a party to accomplish objectives.

As indicated above, the present invention provides a method for selecting a correct brokering strategy, and an associated method for facilitating the exchange of "chips" or units for elemental bidding resources (EBRs). The selection of brokering strategies and associated methods is based on factors such as market conditions, supply and demand, etc. The brokering currency is described herein as a "chip," which is an arbitrary unit of value that can be linked to any EBR that can be part of any infrastructure category. It should be noted that principles of gaming theory (e.g., unpredictable outcomes) can be applied to any of the auction strategies herein. It should also be noted that, in some implementations, the non-auction techniques described herein may be used, whereas in other designs, each and every transaction could be auction-based. Each of these options is detailed below.

Brokering decisions generally facilitate the exchange of chips for resource units during periods when resource units are in large supply and resource requests are in short demand. A resource unit broker (RUB) would employ different auction strategies when different market conditions exist, such as a condition of high supply and low demand. The RUB would select from several available predefined brokering methods including but not limited to first come/first served, incentive provision (resource sale), resource sharing, and weighted resource sharing to determine who gets their respective resource request filled and for what chip cost in a near real time fashion.

Under the present invention, a set (e.g., one or more) of requests (e.g., from a single bidder or multiple bidders) for an elemental bidding resource (EBR) is received. Market conditions for the EBR are evaluated from historical data. It is then determined whether a demand for the desired EBR exceeds a supply of the EBR. Based on the market conditions, the supply, and the demand, a brokering strategy (e.g., auction versus non-auction) and associated method are selected to allocate the EBR. The RUB will then determine an outcome of the brokering method to fulfill at least one of the set of requests. The outcome and associated metrics can then be logged, it can be determined whether a sales contract was created, the EBR can be allocated, and reports/data can be updated accordingly.

Referring now to FIG. 1, a resource management framework (hereinafter framework 10) is depicted as described in Ser. No. 11/756,357, which was cross-referenced and incorporated above. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip usage trending 21A-N, requestor chip pool 22A-N, service level and infrastructure category baseline 24, and service level and infrastructure category baseline 26.

An objective of this framework 10 is to reach a means of maximizing utilization of IT Resources among competing consumers such as business units 12A-B by distribution of the decision making/allocation process according to relative needs of applications. Doing so eliminates the need for traditional SLAs, and allows each business unit to make dynamic "free market" decisions as to how best obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business units' 12A-N behalf. Various methods can be employed by the resource unit broker 28 to fulfill requests for resources to consumers or business units 12A-N. One method is using discrete, static (i.e., non-depleting) chips (as further described in Ser. No. 11/756,374, which was cross-referenced and incorporated above). Another method is involves discrete, depleting chips (as further described in Ser. No. 11/756,357, which was cross-referenced and incorporated above), and yet another involves the use of fluid chips (as further described in Ser. No. 11/756,325, which was cross-referenced and incorporated above). The buyer's agents 14A-N understands the thresholds business units 14A-N are willing to pay, their associated targets for various service level characteristics, and will programmatically employ the most advantageous bidding strategy.

The resource unit capacity planner 16 reports to resource unit brokers 28 (e.g., auctioneers) what resources are available (e.g., infrastructure components) at any given time. Resource allocation software 18 includes products such as Enterprise Workload Manager (EWLM), WebSphere XD, and Partition Load Manager. The goal-oriented policies within these products are updated by inputs from the resource unit broker 28 and/or resource unit capacity planner 16. Change management may be all self-contained in resource allocation software 18, or there may be cases where additional change control needs to be performed. This functionality is provided herein by optional resource unit change and configuration manager 20.

In any event, the present invention provides a way to select a brokering (e.g., RUB) strategy and associated method that best fits current market conditions, and supply versus demand. It should be understood that although in an illustrative embodiment, two parties (e.g., bidders) competing for resources are business units 12A-B within a common organization. However, this need not be the case. The competitors/bidders could be inter-organizational. Still yet, the present invention allows for single bidders to request EBRs.

Figure 2:
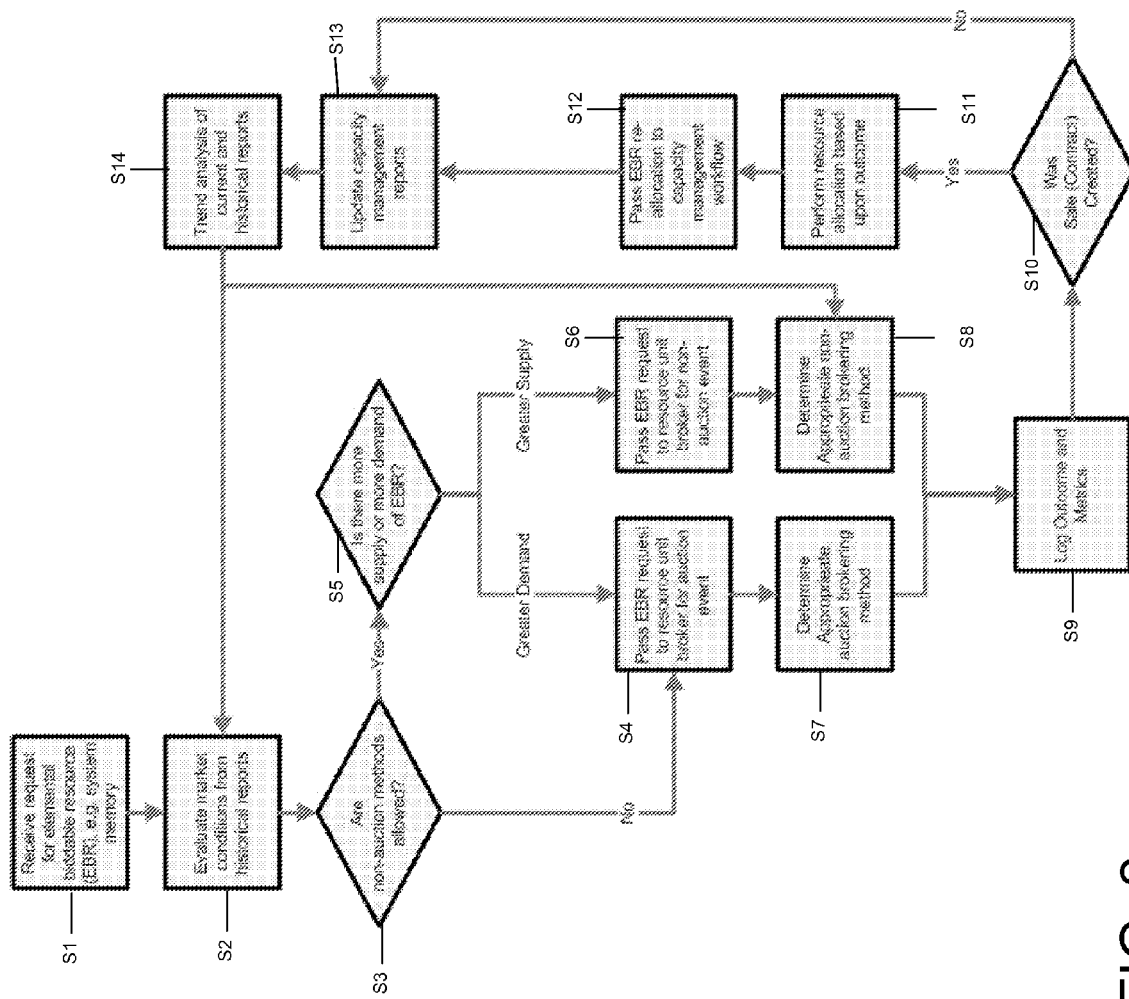
FIG. 2 shows an illustrative method flow diagram according to the present invention.

Referring now to FIG. 2, an illustrative method flow diagram according to the present invention is shown. As depicted, in step S1, a set of requests for an EBR (e.g., system memory) is received. In step S2, market conditions are evaluated from historical data such as reports. In step S3, it is determined whether non-auction methods are allowed to fulfill one or more of the requests. This is generally based on the market conditions. Specifically, if market conditions dictate a good market for the EBR, an auction method might be referred. If non-auction methods cannot be allowed, in step S3, the set of requests is passed to RUB 28 (FIG. 1) in step S4 for resolution via an auction event. However, if market conditions allowed for a non-auction event in step S3, it is determined in step S5, whether supply of the EBD exceeds its demand.

Figure 3:
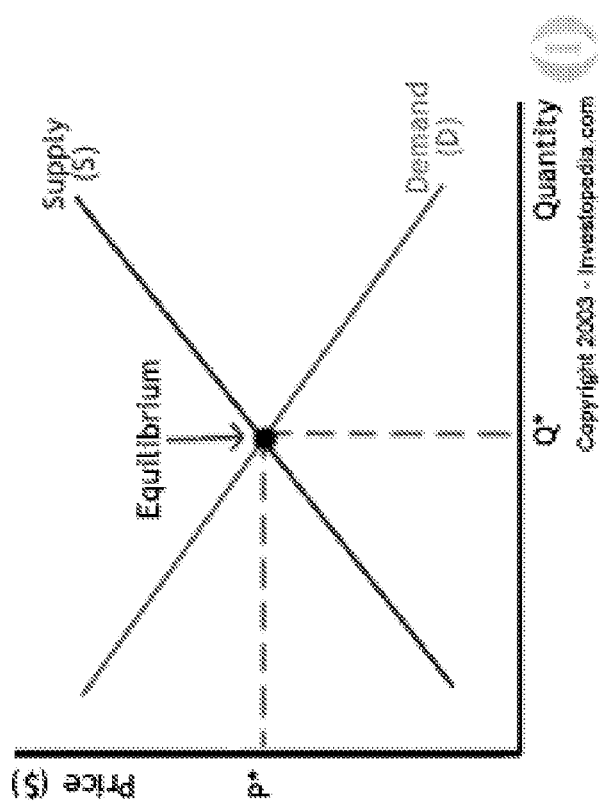
FIG. 3 shows an illustrative chart of supply versus demand for an EBR according to the present invention.

An example of this is shown in FIG. 3. As depicted, there is an equilibrium point, which presents an intersection between price and quantity, and supply and demand. During times of higher demand, auction techniques are preferred so that optimal value can be obtained. Conversely, during times of higher supply, non-auction techniques are preferred so that the EBR can be utilized.

Referring back to FIG. 2 (based on the above discussion), if supply exceeds demand in step S5, the set of requests is passed to RUB 28 in step S6 for resolution via a non-auction event. However, if demand exceeds the supply, the set of requests is passed to RUB 28 in step S5 for resolution via an auction event. The selection of auction versus non-auction events is referred to herein as selecting a brokering strategy. Once the strategy is selected, an associated method will be determined.

Specifically, assuming that an auction-based strategy was selected in step S4, RUB 28 will then select/determine an appropriate auction-based method in step S7 for fulfilling one or more of the request.

A. Auction-Based Techniques

Shown below are some illustrative auction-based techniques practiced by RUB 28:

1. Cooperative Negotiations

Figure 4:
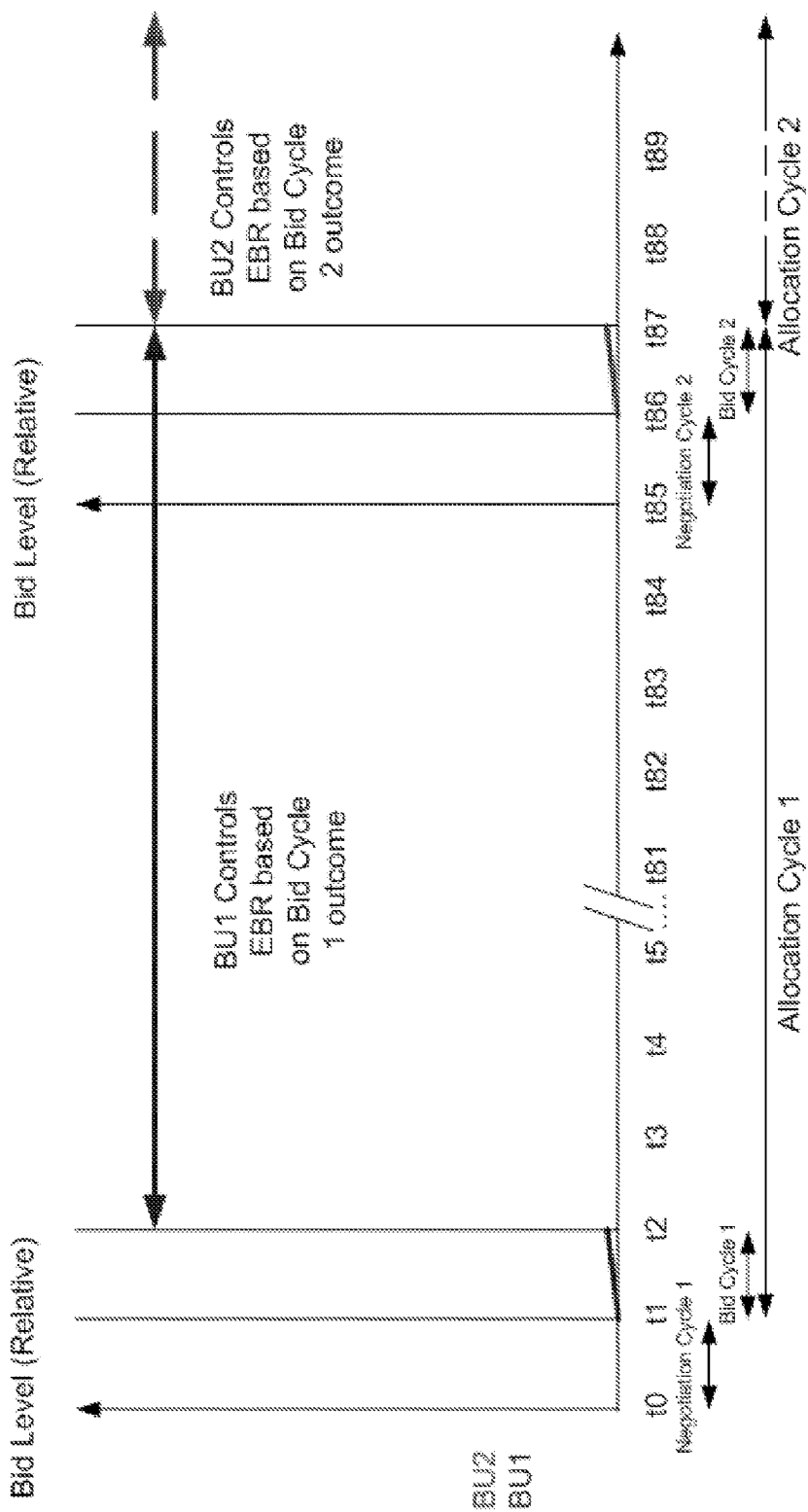
FIG. 4 shows an illustrative diagram of a cooperative bidding scenario according to the present invention.

One auction-based technique is based on RUB 28's involvement in cooperative negotiations between bidders. Referring to FIG. 4, an example of cooperative negotiations between business units/bidders 12A-B is shown. In cooperative negotiations, RUB 28 could facilitate Peer-to-Peer negotiations. In this case, all bidders 12A-B at time t0 could be notified about each other's presence and intent to bid. The business unit's (BU's) would then either directly, or with the RUB 28's assistance, state their processing needs within the next allocation cycle to each other, and see if they can reach mutual agreement (e.g., BU1 will make a minimum bid for a given allocation cycle while BU2 bids nothing; BU2 then makes a minimum bid for a subsequent allocation cycle while BU1 does nothing). This could be a precursor interval to the standard bid cycle.

Note that here, potential bidders for resources notify the RUB of their intention to bid. Cooperative negotiations, to see if a mutually agreeable solution can be achieved without going to a competitive auction, occur during each of the negotiation cycles. In the case illustrated above, a mutually agreeable solution was achieved, wherein BU1 submitted a lone, sole bid for resources in Allocation Cycle 1, and BU2 did the same for Allocation Cycle 2. The condition that would exist in the absence of cooperative bidding techniques would create a higher price for both BU1 and BU2. This is because BU1 and BU2 have not shared any processing needs with each other so each is bidding using gaming theory based on their own need and available chips and a perceived need and available chips of competitors. In this situation, BU1 may still win control of allocation cycle 1 but only after BU2 has bid up the price, causing BU1 to pay more for the same resource. Likewise BU1 or another BU may in turn bid up the price for allocation cycle 2 since there is no guarantee of availability through future cycles. The winner in such a competitive auction is the service provider.

Note further that, in this case, bidders may either have to state their intention to bid over several allocation cycles, or conversely, the allocation cycle may be split into multiple pieces to facilitate the agreed-to allocation. The intent here would be to ensure that two bidders, BU1 and BU2 do not agree to a sequential sharing of resources (e.g., BU1 has them for the first allocation cycle and BU2 for the second), only to see a third bidder (e.g., BU3) come in and outbid BU2 for the second allocation cycle. This race condition could be handled in several ways as mentioned (multiple cycle pre-allocation or division of a single allocation cycle), with each of the end results being roughly equivalent.

It is important to qualify that the cooperative bidding negotiations assume that there is business value between two or more business units or that the business units and the Service Provider are part of the same business. In a scenario where a third party is providing a service in an auction type format to BU's that are not part of the same company, the third party service provider may have little incentive to allow cooperative negotiations, unless market forces dictate otherwise. In this scenario, cooperative negotiations can still occur as long as the two bidding BU's are mutually agreeable to enter into this arrangement and can do so outside of the Resource Unit Broker's (service provider) knowledge. If the auction is public, however the risk of a third bidder coming in to outbid the second BU is a real possibility.

2. Sole Bidder

In general, two possible special options exist when a BU is the sole bidder for resources during any bid cycle and subsequent allocation cycle. One option is the allowance of "zero-cost" bids when a sole bidder exists. In this case, regardless of whether negotiation cycles are nominally used, if only one BU bids on resources, an optional implementation would allow that bidder to have the resources at no cost for that allocation cycle. The rationale here is that the bid process and corresponding chip methodology are used to determine allocation of resources between competing BU's, and if no BU's are in competition at a given moment, then in some implementations, no charges would be forthcoming. A second option is that of allowing a minimum, nonzero bid to be charged for the sole bidder who "wins" the resources. In both scenarios a minimum threshold, or reserve price, can optionally be established by the service provider. This essentially defines the minimum bid amount necessary to secure the EBR. Such a reserve price makes most economic sense when locating resources which are expensive to reconfigure. For example, allocation of processing cycles is quickly accomplished and thus would not lend itself well to use of reserves prices (any money/chips in the provider's pocket is better than none, if processor cycles are otherwise wasted). However, bidding on nonperformance metrics, as might be seen with the movement of 20 terabytes of data to a higher-availability storage system, would require significantly more overhead to accomplish and thus might be best suited to a scenario where a reserve price must be met.

3. Down-Shifting of Bids

Another option which may be relevant in some cases is the concept of "down-shifting" bids once a bid cycle completes. In other words, depending on the allocation strategy pursued, if BU1 bids 100 chips for resources at a given time and BU2 bids 80 chips for resources, the allocation may be made, but the actual expense (i.e., charge to the BU) is "down-shifted" to 10 chips/8 chips; 5 chips/4 chips, or some other ratio which maintains the proportion. Again, this is considered a design option, but its inclusion may be appropriate in some cases, wherein the competition is accomplished for a given allocation cycle, but chip management issues over a long distribution cycle may be mitigated.

B. Non-Auction Techniques

Once the RUB determines a condition of high supply and low demand, it may optionally stop future auction processes and begin employing one of several non-auction brokering methods. A sample of possible non-auction brokering methods is described below.

1. First Come—First Served

This method will set a fixed price and accept the first offer from a bidder at that price. After the sale, RUB 28 will re-evaluate the supply and demand levels. First come—first serve methods will associate a set price with a set time period to which any consumer can respond by completing or agreeing to the price (contract).

2. Incentive Provision (Resource Sale)

During times of extremely low demand the RUB will employ incentive provisioning and reduce the fixed price in an effort to induce consumers to spend chips on the available resources. This condition will generally be determined by a set number (configurable) of failed, first come first serve offers. A failed offer is one that no one responds to and which expires past the offering period.

3. Resource Sharing

In many situations, there may be an abundance of consumers but a low usage of resources. In environments that employ usage based metering and billing, it becomes less relevant how many consumers or users there are on a system and more relevant how much of the resource is being consumed by those consumers collectively. If there becomes a drought of usage (high supply, low demand) then a resource sharing method can be employed. This method will use hardware virtualization technologies to move untapped resources (e.g., CPU, Disk, Memory, Network, etc.) from the contracts that are not using it to an available resource pool. From this pool non-auction fixed prices will be offered to consumers. If that available resource pool exceeds a configurable threshold then RUB 28 can interpret a period of high supply and low (usage based) demand and select the resource sharing method.

4. Weighted Resource Sharing

This builds off the resource sharing method and extends it so that the automated resource broker will give preference to customers sharing resources based on policy. In a low usage scenario, the broker offers a fixed price to consumers with a reduced availability commitment (policy based) since that resource may need to be returned to the original (or in some cases high priority) consumers. Prices will reflect this risk accordingly.

Brokering methods will be re-evaluated after each auction or non-auction event. As each non-auction event or transaction occurs, fewer resources become available and RUB 28 will re-evaluate the current supply and demand levels. At the point that demand rises enough to make auctions competitive, the RUB will return the system back to regular auctions as described in the other applications in this framework 10, some of which were incorporated above and are briefly described below.

Non-Depleting Chips—In this approach, a business unit has effectively a weight of chips that it can apply, in a non-depleting fashion; to any processing needs that it has to accomplish its service level requirements. The nature of these non-depleting chips may be either discrete, i.e., spent in a scheduled auction, or fluid, i.e., spent at any moment without the need for a scheduled auction.

Discrete, Depleting Chips—This principle is analogous to the expenditure of vacation days which must be used during a given chronological cycle, or else will be lost. In pursuing this approach to chip distribution, a business unit has a finite number of chips with which to bid on resources during a given "distribution cycle."

Fluid, Depleting Chips—This principle is analogous to fuel being used to power a car, in that time is viewed in analog terms, and the "burn rate" of fluid chips can be increased or decreased—just as the flow of gasoline to an automobile engine may be increased or decreased—at any given instant. The chips thus deplete and are replenished to all bidders at predetermined intervals.

Referring back to FIG. 2, once a brokering method has been selected by RUB 28 in either step S7 or S8, an outcome will be determined by RUB 28 to fulfill at least one of the set of requests. Thereafter, the outcome and associated metric will be logged in step S9. In step S10, it will be determined whether a sales contract reflecting the outcome and its terms was created. If so, resource allocation is performed based on the outcome, and details of the allocation are passed to a capacity workflow management in steps S11 and S12, respectively. If a sales contract was not created in step S10 (e.g., the terms of the outcome could not be formalized), the method flows to step S13 where reports such as capacity management reports are updated, and then to step S14 where current and historical data/reports are trended.

II. Computerized Implementation

Figure 5:
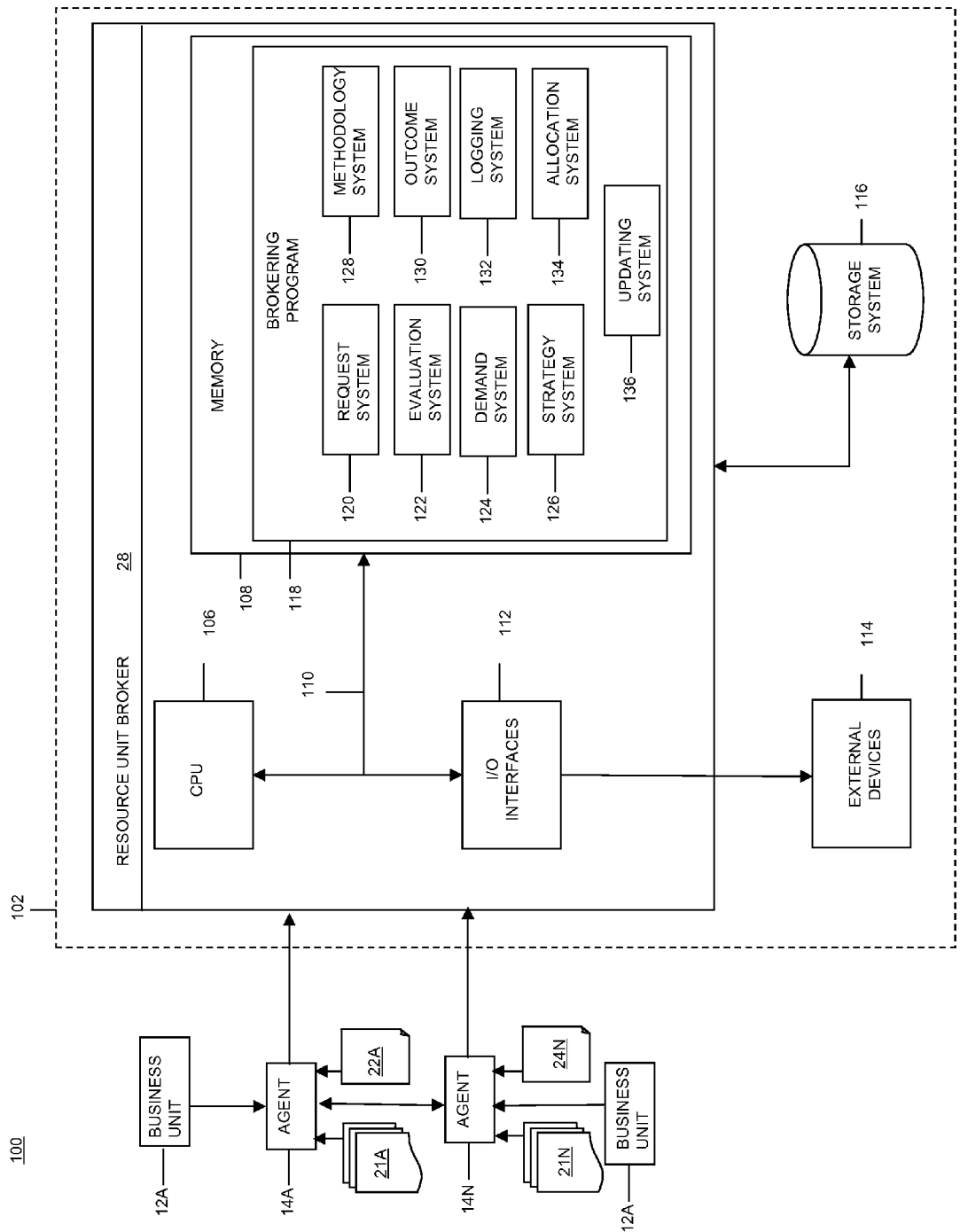
FIG. 5 shows a more detailed computerized implementation of the present invention.

Referring now to FIG. 5, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as brokering program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, resource unit broker 28 is only representative of various possible computer systems that can include numerous combinations of hardware and/or software. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 5 can be included in resource unit broker 28. However, if resource unit broker 28 comprises a handheld device or the like, it is understood that one or more external devices 114 (e.g., a display) and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28. It should be understood that resource unit capacity planner 16, resource allocation software 18, and change and configuration manager 20 have not been shown in FIG. 5 for clarity purposes.

Shown in memory 108 of resource unit broker 28 is brokering program 118, which facilitates the functions of resource unit broker 28 as described above. As depicted, brokering program 118 includes request system 120, evaluation system 122, demand system 124, strategy system 126, methodology system 128, outcome system 130, logging system 132, allocation system 134, and updating system 136.

These systems facilitate the functions as described above in conjunction with FIGS. 1-4. Specifically, request system 120 receives a set of requests for an EBR. Evaluation system 122 evaluates market conditions for the EBR from historical data (e.g., as stored in storage system 116). Demand system 124 determines whether a demand for the EBR exceeds a supply of the EBR (e.g., based on the market conditions). Strategy system 126 selects a brokering strategy to allocate the EBR based on the market conditions, the supply, and the demand. Methodology system 128 selects a brokering method associated with the brokering strategy. The selection of a strategy and associated method can be performed automatically by brokering system 118, or can be done by or in conjunction with a human operator/administrator. In any event, outcome system 130 receives interactions/exchanges with agents 14A-N and determines an outcome of the selected brokering method to fulfill at least one of the set of requests. Logging system 132 logs the outcome and associated metrics, and allocation system 134 allocates the EBR based on the outcome. In performing the allocation, allocation system 134 can first verify whether a contract was created. If not, allocation could be withheld. In any event, updating system 136 can update reports including the historical data based on the allocation.

While shown and described herein as an EBR brokering method, it is understood that the invention further provides various alternative embodiments. For example, in one embodiment, the invention provides a computer-readable/useable medium that includes computer program code to enable a computer infrastructure to broker resources. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to broker resources. In this case, the service provider can create, maintain, support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for brokering resources. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for selecting a brokering method for obtaining desired service level characteristics, comprising:
using at least one computing device for:
receiving a set of requests from at least one bidder for an elemental bidding resource (EBR), the elemental bidding resource including a computational resource sought by the at least one bidder;
evaluating market conditions for the EBR from historical data;
determining whether a demand from the at least one bidder for the EBR exceeds a supply of the EBR;
selecting a brokering strategy to allocate a portion of the EBR to the at least one bidder based on the market conditions, the supply, and the demand, wherein the brokering strategy includes an auction-only technique in the case that the demand exceeds the supply, the auction-only technique including a brokering method selected from a group consisting of: cooperative negotiations between multiple bidders, wherein each of the multiple bidders is notified about each of other multiple bidders; and a down-shifting of bids for the multiple bidders, wherein the down-shifting is performed after completion of a bid cycle, and wherein the brokering strategy includes a non-auction technique in the case that the supply exceeds the demand; and
selecting a brokering method associated with the brokering strategy.

2. The method of claim 1, further comprising:
determining an outcome of the brokering method to fulfill at least one of the set of requests; and
logging the outcome and associated metrics.

3. The method of claim 2, further comprising determining whether a sales contract for the EBR was created.

4. The method of claim 2, further comprising allocating the EBR based on the outcome.

5. The method of claim 4, further comprising updating reports including the historical data based on the allocating.

6. The method of claim 1, in the case that the supply exceeds the demand, the non-auction technique including a brokering method selected from a group consisting of: first come first served among multiple bidders, resource sharing among the multiple bidders, wherein the resource sharing includes moving an unused portion of the EBR from the at least one bidder to an available resource pool, and weighted resource sharing among the multiple bidders.

7. A system for selecting a brokering method for obtaining desired service level characteristics, comprising:
   a system for receiving a set of requests from at least one bidder for an elemental bidding resource (EBR), the elemental bidding resource including a computational resource sought by the at least one bidder;
   a system for evaluating market conditions for the EBR from historical data;
   a system for determining whether a demand from the at least one bidder for the EBR exceeds a supply of the EBR;
   a system for selecting a brokering strategy to allocate a portion of the EBR to the at least one bidder based on the market conditions, the supply, and the demand, wherein the brokering strategy includes an auction-only technique in the case that the demand exceeds the supply, the auction-only technique including a brokering method selected from a group consisting of: cooperative negotiations between multiple bidders, wherein each of the multiple bidders is notified about each of other multiple bidders; and a down-shifting of bids for the multiple bidders, wherein the down-shifting is performed after completion of a bid cycle, and wherein the brokering strategy includes a non-auction technique in the case that the supply exceeds the demand; and
   a system for selecting a brokering method associated with the brokering strategy.

8. The system of claim 7, further comprising:
   a system for determining an outcome of the brokering method to fulfill at least one of the set of requests; and
   a system for logging the outcome and associated metrics.

9. The system of claim 8, further comprising a system for allocating the EBR based on the outcome.

10. The system of claim 9, further comprising a system for updating reports including the historical data based on the allocation.

11. The system of claim 7, in the case that the supply exceeds the demand, the non-auction technique including a brokering method selected from a group consisting of: first come first served among multiple bidders, resource sharing among the multiple bidders, wherein the resource sharing includes moving an unused portion of the EBR from the at least one bidder to an available resource pool, and weighted resource sharing among the multiple bidders.

12. A program product stored on a computer readable medium for selecting a brokering method for obtaining desired service level characteristics, the computer readable medium comprising program code for causing a computer system to:
   receive a set of requests from at least one bidder for an elemental bidding resource (EBR), the elemental bidding resource including a computational resource sought by the at least one bidder;
   evaluate market conditions for the EBR from historical data;
   determine whether a demand from the at least one bidder for the EBR exceeds a supply of the EBR;
   select selecting a brokering strategy to allocate a portion of the EBR to the at least one bidder based on the market conditions, the supply, and the demand, wherein the brokering strategy includes an auction-only technique in the case that the demand exceeds the supply, the auction-only technique including a brokering method selected from a group consisting of: cooperative negotiations between multiple bidders, wherein each of the multiple bidders is notified about each of other multiple bidders; and a down-shifting of bids for the multiple bidders, wherein the down-shifting is performed after completion of a bid cycle, and wherein the brokering strategy includes a non-auction technique in the case that the supply exceeds the demand; and
   select a brokering method associated with the brokering strategy.

13. The program product of claim 12, the computer readable medium further comprising:
   program code for causing the computer system to determine an outcome of the brokering method to fulfill at least one of the set of requests; and
   program code for causing the computer system to log the outcome and associated metrics.

14. The program product of claim 13, the computer readable medium further comprising program code for causing the computer system to allocate the EBR based on the outcome.

15. The program product of claim 14, the computer readable medium further comprising program code for causing the computer system to update reports including the historical data based on the allocation.

16. The program product of claim 12, in the case that the supply exceeds the demand, the non-auction technique including a brokering method selected from a group consisting of: first come first served among multiple bidders, resource sharing among the multiple bidders, wherein the resource sharing includes moving an unused portion of the EBR from the at least one bidder to an available resource pool, and weighted resource sharing among the multiple bidders.

17. A method for deploying a system for selecting a brokering method for obtaining desired service level characteristics, comprising:
   providing a computer infrastructure being operable to:
      receive a set of requests from at least one bidder for an elemental bidding resource (EBR), the elemental bidding resource including a computational resource sought by the at least one bidder;
      evaluate market conditions for the EBR from historical data;
      determine whether a demand from the at least one bidder for the EBR exceeds a supply of the EBR;
      select selecting a brokering strategy to allocate a portion of the EBR to the at least one bidder based on the market conditions, the supply, and the demand, wherein the brokering strategy includes an auction-only technique in the case that the demand exceeds the supply, the auction-only technique including a brokering method selected from a group consisting of: cooperative negotiations between multiple bidders, wherein each of the multiple bidders is notified about each of other multiple bidders; and a down-shifting of bids for the multiple bidders, wherein the down-shifting is performed after completion of a bid cycle, and wherein the brokering strategy includes a non-auction technique in the case that the supply exceeds the demand; and
      select a brokering method associated with the brokering strategy.

* * * * *